Patented May 17, 1927.

1,628,910

UNITED STATES PATENT OFFICE.

THEODORE C. PROUTY AND WILLIS O. PROUTY, OF HERMOSA BEACH, CALIFORNIA, ASSIGNORS, BY MESNE ASSIGNMENTS, TO AMERICAN ENCAUSTIC TILING COMPANY, LTD., OF LOS ANGELES, CALIFORNIA, A CORPORATION OF NEW YORK.

CERAMIC PROCESS AND PRODUCT.

No Drawing. Application filed March 7, 1925. Serial No. 13,883.

Our invention relates to the manufacture of ceramic products. The properties required in ceramic articles vary with the uses to which they are to be put, and one of our principal purposes has been to discover and utilize the various factors which influence and control the production of the desired properties. Among the properties which are required in some of the principal uses to which ceramic products are put are high dielectric capacity and electrical non-conductivity when used as insulators upon high voltage transmission lines, as insulating sleeves for spark plugs and as switch board panels, though in other respects the properties necessary for these uses differ quite widely. When used for spark plug sleeves or for any purpose in which the ceramic material is connected to metal parts and subjected to high and varying temperatures the coeficient of expansion of the ceramic part is an important element. In the production of some articles it is necessary or desirable that the ceramic body at some stage of its manufacture shall be of such consistency that it may be subjected to various machining operations such as drilling, cutting and grinding. The degree and nature of the machining operations which it is necessary or desirable to employ is different in the manufacture of different articles. In the manufacture of spark plugs it may be necessary or desirable to turn the ceramic sleeve to accurate diameter or to cut a screw thread upon it, and for such purposes the material at some stage of its manufacture should be of such consistency as to permit machining to substantially the same extent that metal may be machined, and the properties of the material should be such that the subsequent treatment after machining will either leave the dimensions of the body unaltered or altered so uniformly and invariably that precise allowance may be made for the alteration. A method for securing these ends is set forth in Patent No. 1,453,726, granted May 1, 1923 to Theodore C. Prouty.

Ceramic bodies made of suitable materials are in themselves dielectric and non-conductive to a quite high degree, but for some uses it is desirable that these properties be present in the maximum degree attainable. In Patent 1,453,726 above referred to, there is described the formation of a ceramic body of certain substances, the firing of the same to a stated temperature and the impregnation of the fired body with a non-refractory substance, such as a phenolic condensation product, for the purpose of increasing the dielectric and non-conductive properties of material not designed to withstand high temperatures.

We have discovered that by the use of a bisque mixture prepared in some respects like that described in the prior patent above referred to, and molded and fired as herein described, we can carry the firing temperature to the point necessary for the production of many ceramic products, for instance wall tile and slabs for switch-board panels, and produce a fired bisque that will yield readily to certain machining operations, such as grinding, and that may be drilled and cut to the extent necessary for many purposes. In respect to the machining of the product, the process and product described herein differ from the process and product described in Patent 1,453,726 in that in the patented process the machining was performed while the bisque material was held in form by a temporary binder and before the mixture had been fired to a temperature sufficiently high to form a bisque, the firing in the bisque kiln taking place after the machining. The capacity for machining possessed by the product resulting from our invention described herein is independent of the use of a temporary binder and exists in the completely fired bisque.

The bisque prepared and fired as described herein is absorbent of organic substances, the gums such as latex, paraffin and the bitumens, including asphalt. In Patent 1,453,726 there is a description of the permeation of the fired bisque with certain non-refractory substances, such as the phenolic condensation products, for the purpose of increasing the dielectric capacity and weatherproofing. We have discovered that permeation with certain of these substances not only produces these effects in a bisque produced as described herein, but that it also makes the material yield more readily to cutting and drilling, and with less wear upon the tools, and that it increases the elastic limit of the material without decreasing its strength. In Patent 1,453,726 there is a description of the use of phenolic condensation products and other substances requiring the application of heat after absorption of the filler in the bisque. We have discovered that bituminous substances, while in some instances requiring some degree of heat to reduce their viscosity during absorption, not only do not require the application of heat after permeation of the bisque, but that the application of heat after permeation would have a deleterious effect in its tendency to expel the absorbed material from the bisque. The application of heat in the presence of an excess of the bituminous substance promotes absorption, but heating the saturated bisque alone tends to expel the bitumen, and is therefore to be avoided.

Other objects of our invention include the production of ceramic bodies, of such uniform dimensions as to be interchangeable when used for purposes requiring close fitting and accuracy, the production of a bisque having the strength necessary in uses where the finished product is subjected to considerable strain and rough usage, and that will retain a glaze without checking; the production of a bisque mixture that may in firing be raised to maximum temperatures rapidly, and cooled rapidly, thus effecting the economy incident to a decrease in the time of firing, and to render it possible to produce tile in sizes much larger than heretofore made and to produce large plates and slabs of the same material we use for tile.

Our investigations show that the properties of fired bisque may be controlled not only collectively, but to a considerable extent individually by suitable regulation of the pressure under which the bisque mixture is molded and a corresponding adjustment of the maximum temperatures to which it is fired.

Ceramic bodies of substantially the same degree of hardness and strength may be produced from the same bisque mixture either by molding the material under a low pressure and firing to a high temperature, or by molding the material under a higher pressure and subjecting it to a lower firing temperature; the high molding pressure and relatively low firing temperature result in a product less resistant to machining than is produced by a lower pressure and higher firing temperature.

Contraction appears to be controlled principally by the composition of the mixture, including its water content, and the firing temperature.

We have above referred to rapidity of firing the bisque as one of the objects of our invention. An important agency in bringing about this result is the presence in the bisque mixture of a small amount of calcium, the amount not being critical provided it does not exceed a relatively small proportion.

The objects above stated and others can be better understood in connection with the manufacture of a particular ceramic product, and we will therefore refer more particularly to the manufacture of wall tile in order to make the description of my invention more specific.

Floor and wall tile, porcelain, etc., as heretofore manufactured is composed of a mixture consisting principally of alumina and silica combined for the most part in silicate of the various types occuring in clay, feldspar, etc. The use of aluminum silicate as the base and major part of the bisque mixture and the methods now pursued in the manufacture of wall tile from that substance result in unequal shrinkage and distortion of the bisque in firing with resulting large losses due to the necessity of rejecting a very considerable proportion of the product on account of its irregularity in form and size. In the manufacture of wall tile even the part of the product that conforms to existing manufacturing standards includes tiles that vary in size to an extent that renders the setting of the tiles a difficult and tedious process, often rendering it necessary for the tile-setter to try a large number of tiles before finding one that will fit into the space left by the adjoining previously set tiles, or to fill with cement the space left around the edge of a tile that is too small. Furthermore, the existing methods of manufacture necessitate the acceptance and use of tiles the glazed face of which departs too widely from a plane surface and lacks the uniformity of texture and freedom from blemishes necessary to present a perfect appearance in the finished tile work.

It is an established fact that by the methods heretofore in use tiles are not and cannot be manufactured in predetermined grades. The tiles as they come from the kilns are sorted upon the basis of blemishes, warpage and appearance into three grades, selected, standard and commercial. So few of the "selects" are produced that they do not form a staple article of commerce, i. e. they cannot be produced in the unlimited quantity necessary to meet any demand. The "selects" now produced are merely a by-product resulting from the production of the other grades, the standard and commercial, and no more of the selects can be produced than happen to result in this way. The proportion of "selects" so produced is very small, less than one and one-half per cent of the total output, as shown by the reports of the United States Department of Commerce. The result is that tile manufacturers can accept orders for only a limited amount of "select" tiles, and can fill such orders only by waiting until a sufficient number of "selects" has accumulated.

The variation in dimensions of tiles of the same nominal size and shape produced heretofore has led not only to the disadvantages above referred to, but the variations extend to such wide limits as to necessitate the separate grading of tiles nominally of the same size and shape into grades varying by different amounts from the nominal dimensions. This, of course complicates the handling, sale and setting of the tiles, necessitates the keeping by the manufacturer and dealers of large stocks, and frequently leads to difficulty when lots of tile purchased at different times are used on the same work.

By our improved process we produce tiles in quantity and make such select tiles not only in conformity with the "select" standard in respect to blemishes, warpage and appearance, but in addition make all tiles of each size and shape uniform in dimensions and interchangeable whether they be "selects" or the next lower grade, i. e. "standards", which latter are the highest grade produced in quantity by the processes heretofore used. The product of our process as now used on an extensive scale consists of from eighty to ninety per cent of select tiles and the remainder of the standard grade, the percentage of tiles rejected by reason of imperfection being negligible. Disregarding the tiles which are rejected as too imperfect to be marketable the processes heretofore in use produce less than one and a half per cent of tiles graded as "selects", 34% of "standards", and 65% of "commercials" as shown by statistics compiled by the United States Government.

We have discovered that a mixture containing magnesia and a relatively small proportion of alumina contracts uniformly and to a very slight extent when fired to the temperature necessary to produce wall tile, and that the variation in contraction between different temperatures is so slight that by confining the maximum firing temperature between relatively narrow limits, tile varying very slightly in dimensions from the predetermined standard size can be produced. The amount of water in the powdered bisque mixture should be in the neighborhood of ten per cent and should be kept constant within narrow limits.

A bisque mixture of this character which we have used in the manufacture of tile contains about 27% of magnesia, 6% of alumina, 61% of silica and 4% calcium, the remainder water and incidental ingredients occurring with the substances used. Rigid adherence to the precise proportions named is not necessary, but the amount of magnesia should be substantially in excess of the alumina, the amount of calcium should be kept low, and in general the relation of the quantities of the different ingredients should follow the order named though not necessarily in the exact proportions stated. Such mixture may be prepared conveniently by combining 85 parts by weight of talc, containing approximately 63.5% of silica, 31.7% of magnesia and the remainder water with sometimes minute amounts of other ingredients, 15 parts by weight of clay containing about 40% alumina and 47% silica, and a quantity o. a calcium compound containing 4 parts by weight of calcium. The calcium may be added in any suitable form such as the sulphate, chloride or oxide, or may be that contained in other ingredients. The amount of silica in the mixture stated above as 61%, may vary within comparatively wide limits, the additional amount contained in the clay which is added for the purpose of introducing the requisite amount of alumina producing no effect substantially different from that caused by the addition of uncombined alumina. The controlling factor is the relation between the quantities of magnesia, alumina and silica, but with more permissible latitude in the amounts of silica than in the relative amounts of alumina and magnesia. In the bisque mixtures now commonly used the silica has ranged in the neighborhood of 47% and the alumina around 40%, magnesia being tolerated only in negligible amounts, generally under a half per cent. In our improved mixture we greatly diminish the proportion of alumina, may increase the proportion of silica, and instead of attempting to obtain ingredients free of magnesia and calcium, or tolerating them only in negligibly small amounts we introduce an amount of magnesia greatly in excess of the alumina, and add calcium to the extent of about four per cent of the mixture.

This mixture when fired to about 1200 to 1230 degrees centigrade produces tile possessing in maximum degree all of the requisites of select wall tile, including great strength as shown by breaking tests, and the physical properties of the fired bisque are such that the slight variations which occur in dimensions of the tiles can be readily eliminated by grinding with a suitable abrasive such as a carborundum wheel of suitable hardness and texture. The time of firing required by the mixture described is much shorter than that necessary for producing the bisque from mixtures now used, composed principally of alumina and silica compounds, thus economizing heat and increasing the output of the kilns. In the dry mold process with a pressure upon the mixture in the mold of about 1200 pounds per square inch and a maximum firing temperature between Seger cones 6ª and 7 in the tunnel kilns hereinafter referred to the firing period for the bisque is about 48 hours and the time for firing the glaze about 12 to 14 hours. Differences in the composition of the raw materials may cause variations in these factors. The form in which the calcium is present appears not to be important as we have had good results with the oxide, chloride and sulphate.

The slight contraction which takes place in firing the mixture above described is so uniform throughout the mass that warping and cracking of the bisque in firing is practically eliminated, thus making possible the manufacture of tiles of much larger size than heretofore produced and also the manufacture of large slabs and plates such as used for table tops. Large plates of the thickness of ordinary tile may be marked to simulate tile of smaller size as described in our co-pending application for patent, executed on the same date herewith, Serial No. 13,887 filed March 7, 1925.

We have found that tiles of the same degree of hardness vary in mechanical strength and also vary in respect to the possibility and ease of subjecting them to machining processes such as drilling and grinding. Our investigations also indicate that the hardness of ceramic products such as tile is dependent not only on the materials entering into its composition and the temperature to which it is fired, but also on the degree of pressure under which the material is molded previous to firing, and that tiles of substantially the same degree of hardness and strength may be produced from the same bisque mixture either by molding the material under a low pressure and firing it to a high temperature or by molding the material under a higher pressure and subjecting it to a lower firing temperature, the latter being preferable by reason of the fact that the lower firing temperature causes less shrinkage and produces a product less resistant to machining operations, such as grinding, while a high molding pressure imparts a high degree of mechanical strength with but slight increase in the resistance to machining. The possibility of securing the requisite hardness and strength by a proper degree of pressure in the mold instead of by high temperature in firing is of great importance in the manufacture of tiles of accurate and uniform size as by this means it is possible to produce perfect tile that will yield readily to grinding. By utilizing and co-relating these different factors ceramic products having the properties necessary for different purposes may be made, and with any given materials and proportions of materials the combination of molding pressure and firing temperatures best adapted to the production of the desired product may be ascertained by preliminary trials. The mechanical strength of tiles made according to my invention has been repeatedly tested by placing one of my tiles and a tile made by prior processes under precisely the same conditions of pressure. This may be done conveniently by placing the two tiles of the same size and degree of hardness opposite each other and separated by small blocks at the ends and then applying the pressure of a screw vice to the central separated parts of the tiles. Tiles made by the old processes almost invariably break under this test leaving my tile intact, and this is true even when the tile made by my process is unglazed and considerably less in thickness than the old glazed tile.

We have also found that close regulation and uniformity of temperature is facilitated by the use of a tunnel kiln of small cross section. In practice we have used a tunnel kiln having a cross-sectional area of about 24″ in width and in height. We set the tiles in open formation upon the conveyor platform without saggers. In the pre-heating part of the kiln the ware is protected from the direct application of heat by the inclosing walls of the muffle, following which the maximum heat is attained by the direct application of heat. In the pre-heating zone the temperature of the bisque is raised to a point sufficiently high to prevent cooling of the burning gases and the separation of carbon in the zone of maximum heat where the burning gases have access to the ware. A circular tunnel kiln of the type which we have used is illustrated and described in our co-pending application for Patent Serial No. 13,885 executed upon the same date herewith, and filed in the United States Patent Office March 7, 1925 and a straight tunnel kiln which we have used is described in our applications Serial Nos. 13,884 and 70,775 filed respectively March 7, 1925, and November 23, 1925. By doing away with the saggers we are enabled to expose the tile to the direct, uninterrupted action of the source of heat in the zone of maximum temperature, thereby not only avoiding the waste of heat incident to the necessity of heating the saggers when used, but also facilitate direct and quick control of the temperature of the bisque by regulation of the source of heat. The relatively small cross-section of the body of material being fired affords direct access of the maximum heat produced by the source of heat to all parts of the charge, thus obviating the considerable difference in temperature of different parts of the large charges which are treated in kilns of large cross-sectional area and also rendering the charge subject to quick and easy temperature control by regulation of the source of heat.

With the mixture which we have used in the manufacture of tile we have maintained the maximum temperature of the bisque furnace within the limits defined by two successive Seger cones. For instance, in making tiles requiring a firing temperature of 1200 degrees centigrade, corresponding to Seger cone 6a, we keep the maximum temperature between 1200 degrees centigrade and 1230 centigrade, the latter temperature corresponding to the next higher cone in the Seger series, 7. There is, of course, a direct relation between the breadth of the limits of maximum temperature and the variation in dimensions and consequent amount of grinding of the fired tiles. We have found, however, that it is practicable to fire the tiles to a maximum temperature defined by two successive cones of the Seger series, and have found that such limitation of the firing temperature obviates the necessity of more than a slight amount of grinding, if any.

The mixture above described containing a small proportion of calcium which we use possesses a further advantage in that it can be brought to maximum temperature and cooled without damage much more rapidly than products consisting wholly or substantially wholly of clay, and other aluminum silicates. It is this property of the mixture that lessens the necessary time of firing.

In manufacturing our improved tiles by the method and of the material herein described we have found it possible to make the tiles of each size uniform in dimensions within the limits of plus or minus .005 of an inch, which is a degree of accuracy that makes the tiles fully interchangeable in setting, and obviates the necessity for the tilesetter ever to search for tile of the right dimensions to interfit with other tiles. This interchangeability greatly reduces the amount of tile that must be kept in stock by the manufacturer and dealer and insures that tile purchased at different times or in different lots will be of not only the same nominal size but will be of the same actual size. This uniformity of size results partly from the fact that by reason of the uniform shrinkage of the bisque a large proportion of the tiles conform almost precisely to the above stated standard of uniformity when they leave the kiln, and is partly due to the fact that the slight amount of grinding necessary may readily be effected by means of a carborundum or other grinding wheel of suitable hardness and texture, thus bringing the reduction of over-size tiles to standard dimensions within the limits of cost which are imposed upon a commodity of this character. We prefer to grind the tiles to size after they have been fired in the bisque furnace and before applying the glaze.

In any process of manufacturing tile it is, of course, necessary to fire the bisque to a temperature sufficiently high to produce a product having the degree of hardness, strength, etc. demanded by the particular use to which the tile is to be put. For instance, a floor tile must be harder and fired to a higher temperature than a wall tile, and a tile that is to be subjected to the action of water, such as tile used in swimming tanks, must be fired to a relatively high temperature in order to render it non-absorptive. While in the manufacture of tile by processes heretofore used there has been an effort to attain the maximum firing temperature necessary without exceeding that temperature to an excessive degree the use of periodic kilns and of tunnel kilns of large cross-sectional area with the ware enclosed in saggers has prevented the limitation of heat to close limits. In fact in the kilns heretofore used there is a wide difference in temperature between the upper and lower parts of the charge passing through a tunnel kiln. This difference often amounts to two to three hundred degrees and has led to the custom of placing in different positions products requiring different firing temperatures. These variable temperature conditions have resulted in restricting the function of temperature control to the maintenance of a range of temperature that would not cause excessive warping and distortion of the tile, and it has not heretofore been known that the bisque could be formed of a mixture subject to such slight and uniform contraction in firing that by firing it under conditions admitting of close temperature control tile of almost precisely uniform dimensions could be produced.

We have discovered, however, that whatever may be the temperature of firing necessary for tile for any particular purpose, if a suitable mixture is used in the bisque and if the kiln can be and is so operated as to maintain a maximum temperature falling within a relatively narrow range above the minimum temperature necessary the contraction of the tiles will be uniform within very narrow limits and a product of uniform dimensions will be obtained. Our improved mixture high in magnesia and low in alumina possesses the low and uniform degree of contraction requisite for this purpose, and in addition produces a bisque that when fired short of vitrification is easily ground thereby permitting the ready elimination of such slight differences in dimensions as are present when the tile is taken from the bisque kiln.

The interchangeability which forms one of the most important advantages of our improved process and of the tiles formed thereby is the result, therefore, of using the right degree of molding pressure to secure the requisite hardness and strength with a relatively low firing heat, limiting the maximum firing temperature of the bisque furnace within relatively narrow limits, and the use of a material which when mixed with a predetermined proportion of water has a sufficiently narrow range of contraction between such limits of firing temperature, and which also produces a bisque of such character that it is practical to grind to standard size such of the tiles as depart from the established standard by more than a minute variation. Our invention in its broader aspect is not confined to the use of the talc and clay mixture referred to herein, but extends to the use of any material which has a sufficiently narrow variation of contraction within the limited range of maximum firing temperature employed, and which will produce a bisque having a high degree of mechanical strength and of such physical properties that it will be commercially practicable to grind the fired tile to standard dimensions.

A valuable property of the bisque produced by our process lies in the fact that it readily absorbs organic substances by which certain of the useful properties inherent in the bisque are intensified and other new properties are acquired. The fired bisque is in itself highly dielectric and non-conductive, but these properties may be greatly intensified by the absorption of certain organic substances, and other organic substances render the bisque non-absorbent of water. Saturation of the bisque with bituminous substances, such as asphalt, brings about a substantial increase in the dielectric and non-conductive qualities of the bisque and produces a material highly efficient for electrical switch-board panels and similar purposes. Saturation with asphalt has the further effect of increasing the facility with which the bisque can be subjected to machining operations such as drilling, cutting, etc.

Bisque of the character required for wall tile when produced by my process may when taken from the kiln easily be subjected to such machining processes, principally grinding the edges to exact dimensions, as are desirable in this product. The application of substances such as asphalt, however, renders the bisque still less resistant to cutting and drilling and will in many instances render these operations possible and practicable in the case of bisques otherwise too resistant and destructive of tools to admit of such operations being practicable or possible. Sufficient saturation of the bisque with bituminous matter may generally be brought about by simple immersion of the bisque body in the bituminous liquid, heat being applied if necessary to liquefy or reduce the viscosity of the bitumen. While ordinarily not necessary, a vacuum may be utilized to remove the air from the pores of the bisque in order to cause more effectual penetration by the bitumen, and pressure may be utilized to force the organic substance into the pores of the ceramic body.

On account of the shrinkage and warpage of the product incident to the use of either the dry mold process or the plastic process as heretofore used it has not been practicable to produce large pieces of perfect form, such as the slabs used for table tops, or smaller pieces, such as tiles, of substantially less thickness than those heretofore in use. The description of our invention as applied to the manufacture of tile contained herein relates to the dry mold process, but many of the features of the invention may find advantageous use in the plastic process. The pressure to which the bisque mixture is subjected, preparatory to firing varies from a few pounds per sq. inch in the plastic process to many thousand pounds per sq. inch in the dry mold process. In the dry mold process the ingredients of the mixture are reduced to a fine powder which is placed in a mold or die and subjected to the degree of pressure necessary to produce the texture required. The mixture used in the dry process when molded contains a small amount of free water, ordinarily from five to ten per cent, which amount is insufficient to agglomerate the powdered material but sufficient to cause it to cohere in its molded form when subjected to the necessary pressure. Before being fired the free water is expelled from the molded article by means of drying ovens maintained at a moderate temperature, in the neighborhood of 150 to 200 degrees Fahrenheit. By the use of our invention the dry mold process is available not only for the purposes and with the advantages hereinbefore described, but also for the production of large plates and slabs of accurate form and perfect appearance, as well as for the production of smaller articles such as wall tile, of substantially less thickness, relative to their area, than heretofore made.

We have found that in a glazed tile saturation with paraffin of the part of the bisque lying immediately adjacent the glaze effectually prevents discoloration resulting from stains being carried through the body of the tile by moisture. One means we have employed to effect saturation of the layer adjacent the glaze is by applying to the back of the tile just sufficient paraffin to form a layer extending from the glaze part way through the thickness of the tile. Upon warming the tile in a horizontal position with the unglazed side above, the paraffin will melt and percolate downward through the body of the tile and form a layer next the glaze leaving the unglazed side of the tile free of paraffin and in its original condition. It is necessary that the unglazed side of the tile be kept free of paraffin in order that it may bond properly with the cement used in setting. Tile so prepared is practically stain-proof as water is the only stain carrying medium that ordinarily need be guarded against and the paraffin layer is inpenetrable by water.

The particular hydrocarbon to be used will depend upon the object sought and may readily be determined by trial.

The thickness of tiles as heretofore manufactured is determined principally by the necessity of securing adequate strength and the necessity of avoiding the loss incident to warpage in the manufacture of tiles thinner than those heretofore made. Wall tile as heretofore manufactured is not materially less than three-eighths of an inch thick over the major part of the area of the tile, part of the area sometimes being thinned to the extent of about a thirty-second of an inch. By our process described herein we have found it possible to make tiles less than three sixteenths of an inch in thickness at the thickest part and with the thinner parts of the area one-eighth of an inch in thickness with only negligible loss from warpage or cracking in firing and possessing the strength necessary.

A tile of such thinness, while possessing the necessary mechanical strength and being free of warpage has the disadvantage of not filtering out the coloring matter contained in the cement and mortar used in its installation, and to overcome possible discoloration of the white glaze we have found that by applying to such thin tile the paraffin or other waterproof layer adjacent the glaze, leaving the back free as hereinbefore explained, these thin tile resist stain from water or moisture carrying coloring matter as fully as do thicker tile treated in the same way and to a much greater extent than untreated tile of any thickness. Among the advantages of tile thinner than that heretofore manufactured is a material reduction in weight. Reduced weight not only reduces shipping charges, but the close figuring of the weight of material entering into the construction of vessels makes it desirable to reduce the weight of the tile work to the greatest extent possible. By the use of our process the amount of material entering into the construction of the tile can be decreased to the extent indicated by the decreased thickness above referred to, and the requisite strength can be secured by a corresponding increase of molding pressure, or by some increase in the firing temperature or partly by each of these measures.

The crazing of glazed tile and other glazed ceramic bodies may develop immediately upon the completion of the product or may develop subsequently in a glaze that was originally free from craze and apparently a perfect product. In some instances shivering of the glaze occurs immediately upon the cooling of the tile after firing, that is the glaze separates in fragments from the bisque, but shivering rarely occurs in a tile that was free from that defect when made. The remedies for the occurrence of crazing and shivering in the tile as originally produced are well understood and consist in altering the composition of the glaze, generally by the addition of clay or silica. These remedies have the effect of causing the glaze and bisque during firing to contract with sufficient uniformity to prevent setting up stresses which will cause crazing or shivering at the temperature of the cooled product, which ordinarily is a temperature of 60 to 80 degrees Fahrenheit. While the avoidance of crazing in the product as originally made is an easy matter and well understood, the causes of the type of crazing that develops subsequently have not heretofore been understood with sufficient definiteness to lead to their elimination.

We have found that a glaze and bisque having quite different coefficients of expansion may be combined to form a glazed body free from craze and apparently perfect as it comes from the glaze kiln, and that the mere fact that the body comes from the kiln cooled to the prevailing temperature without crazing does not establish that the coefficient of expansion of the glaze and bisque are substantially identical, or close enough together to prevent crazing under the conditions and the extremes of temperature to which the product will be subjected in use. Furthermore, our investigations indicate that in an initially perfect glazed ceramic body there may be internal stresses due to unequal contraction in firing, which stresses may lead to crazing when the article is subjected to shock or to temperatures varying materially from that to which the article was cooled when taken from the glazing kiln, even though such variations of temperature be less than would cau crazing in the absence of initially existing internal stresses.

The production, therefore, of a glazed ceramic body that will not craze, after being initially produced without crazing, requires a coincidence between the coefficients of expansion of the glaze and bisque so close as to prevent the existence of destructure stresses not only within the relatively narrow range of temperature to which the article is cooled when produced, but throughout the range of temperature to which it will be subjected in use, varying frequently from far below freezing to the highest summer heat.

A further factor influencing the production of craze is the relation of the coefficient of expansion of the cement in which the tile is set to the coefficients of expansion of the bisque and glaze of the tile. The influence of the cement is frequently observable in the existence of bands of crazing extending uninterruptedly across many tiles, leaving adjoining tiles and parts of tiles entirely free of crazing, this being due to strains between the cement and bisque which are in turn transmitted to the glaze. The prevention of the development of crazing in the tile after setting is dependent upon a sufficiently close coincidence between the coefficients of expansion of the glaze, bisque and cement to prevent destructive stresses in the glaze under the conditions of use. While the degree of expansion of the glaze can be regulated with comparative ease, that of the bisque is less easily controlled and the expansion of cement is a fixed factor, being substantially the same as that of steel. Our investigations have shown the existence of wide divergences between the coefficients of expansion of cement and of the bisque and glaze of wall tile as heretofore made.

The bisque resulting from our process as herein described has a coefficient of expansion varying only negligibly from that of cement and the proper adjustment of the glaze to the bisque results in a tile that when installed is free from crazing by reason of the absence of destructive stresses between the cement, bisque and glaze. We attribute the virtual coincidence in the degree of expansion of cement and my improved bisque to the presence in the latter of the large proportion of magnesia and relatively small proportion of alumina which forms one of its distinguishing features.

Another factor that influences the development of crazing after the installation of the tile is the degree of heat conductivity of the bisque. The relatively thin glaze lying on the surface is subject to sudden temperature changes which if not quickly communicated to the relatively large mass of the bisque will cause stresses due to differences of temperature in the glaze and bisque, thus to that extent increasing the tendency to craze. The heat conductivity of magnesia is twice that of silica and alumina, and its presence in our bisque imparts to it a degree of heat conductivity much higher than that of bodies in which silica and alumina predominate, a fact which is strikingly noticeable upon cooling from the same temperature and under the same conditions one of our improved tiles and a tile made by processes heretofore in use. The high heat conductivity of our improved bisque thus contributes materially to the freedom from crazing of the finished and installed tile by minimizing differences in temperature between the glaze and bisque incident to sudden changes of temperature.

In its broader aspect our invention includes not only the use of magnesia as herein described but also the use of equivalent substances possessing the properties shown to be advantageous by our investigations referred to herein.

Processes have heretofore been devised for making steatitic porcelain by mixing powdered steatite with fire-clay or other binder and firing the same to as high a temperature as the articles will stand without loss of shape, and steatite and talc, which is chemically of similar composition, have been used as the basis of vitrified products, refractory crucibles, etc. In the case of the articles made by such processes there has been no need for uniformity of dimensions or freedom from crazing when glazed, and we know of no instance in which a rigid limitation of the molding pressure or of the range of maximum firing temperature has been used or recognized as a means for securing interchangeability of product. Heretofore heat regulation in firing bisque has been restricted to a more or less rough approximation of the maximum temperature necessary.

Claims:

1. The process of manufacturing ceramic articles which comprises the operations of subjecting the bisque to a maximum heat limited to a relatively narrow range of temperature and forming the bisque mixture of material that has a relatively narrow range of contraction within said range of temperature.

2. The process of manufacturing ceramic articles which comprises the operations of subjecting the bisque to a maximum heat limited to a relatively narrow range of temperature, forming the bisque mixture of material that has a relatively narrow variation of contraction within said range of temperature and which material when so heated possesses physical properties that render it amenable to machining operations, and machining the fired bisque.

3. The process of manufacturing tile which comprises the operations of subjecting the bisque to a maximum heat limited to a relatively narrow range of temperature, forming the bisque of a mixture low in alumina and high in magnesia and having a relatively narrow range of contraction within said range of temperature.

4. The process of manufacturing ceramic articles which comprises the operations of subjecting the bisque to a maximum heat limited to a relatively narrow range of temperaure, forming the bisque of a mixture low in alumina and high in magnesia and having a relatively narrow variation of contraction within said range of temperature, and when so fired having physical properties that render it amenable to machining operations, and machining the fired bisque.

5. The process of manufacturing tile which comprises the operations of subjecting the bisque to a maximum heat limited to a relatively narrow range of temperature, forming the bisque of a mixture high in talc and low in clay having a relatively narrow range of contraction within said range of temperature.

6. The process of manufacturing ceramic articles which comprises the operations of subjecting the bisque to a maximum heat limited to a relatively narrow range of temperature, forming the bisque of a mixture high in talc and low in clay and having a relatively narrow variation of contraction within said range of temperature and when so fired having physical properties that render it amenable to machining operations and machining the fired bisque.

7. The process of manufacturing ceramic articles which comprises the operations of subjecting the bisque to a maximum heat limited to a relatively narrow range of temperature, forming the bisque of a mixture of material containing over 15% of magnesia and that has a relatively narrow range of contraction within said range of temperature.

8. The process of manufacturing ceramic articles which comprises the operations of subjecting the bisque to a maximum heat limited to a relatively narrow range of temperature, forming the bisque of a mixture containing over 15% of magnesia and having a relatively narrow variation of contraction within said range of temperature and when so fired having physical properties that render it amenable to machining operations and machining the fired bisque.

9. The process of manufacturing ceramic articles which comprises the operations of subjecting the bisque to a maximum heat limited to a relatively narrow range of temperature, forming the bisque of a mixture containing over 50% of talc and having a relatively narrow range of contraction within said range of temperature.

10. The process of manufacturing ceramic articles which comprises the operations of subjecting the bisque to a maximum heat limited to a relatively narrow range of temperature, forming the bisque of a mixture containing over 50% of talc and having a relatively narrow variation of contraction within said range of temperature and when so fired having physical properties that render it amenable to machining operations and machining the fired bisque.

11. A process conforming to claim 1 and in which the bisque is glazed after being machined.

12. A process conforming to claim 2 and in which the bisque is glazed after being machined.

13. A process conforming to claim 3 and in which the bisque is glazed after being machined.

14. A process conforming to claim 4 and in which the bisque is glazed after being machined.

15. A process conforming to claim 5 and in which the bisque is glazed after being machined.

16. A process conforming to claim 6 and in which the bisque is glazed after being machined.

17. A process conforming to claim 7 and in which the bisque is glazed after being machined.

18. A process conforming to claim 8 and in which the bisque is glazed after being machined.

19. A process conforming to claim 9 and in which the bisque is glazed after being machined.

20. A process conforming to claim 10 and in which the bisque is glazed after being machined.

21. A process conforming to claim 1 and in which the bisque mixture contains a relatively small proportion of calcium.

22. A process conforming to claim 2 and in which the bisque mixture contains a relatively small proportion of calcium.

23. A process conforming to claim 3 and in which the bisque mixture contains a relatively small proportion of calcium.

24. A process conforming to claim 4 and in which the bisque mixture contains a relatively small proportion of calcium.

25. A process conforming to claim 5 and in which the bisque mixture contains a relatively small proportion of calcium.

26. A process conforming to claim 6 and in which the bisque mixture contains a relatively small proportion of calcium.

27. A process conforming to claim 7 and in which the bisque mixture contains a relatively small proportion of calcium.

28. A process conforming to claim 8 and in which the bisque mixture contains a relatively small proportion of calcium.

29. A process conforming to claim 9 and in which the bisque mixture contains a relatively small proportion of calcium.

30. A process conforming to claim 10 and in which the bisque mixture contains a relatively small proportion of calcium.

31. A process conforming to claim 1 and in which the bisque is subjected during the period of maximum temperature to contact with the gases of combustion from the source of heat.

32. A process conforming to claim 2 and in which the bisque is subjected during the period of maximum temperature to contact with the gases of combustion from the source of heat.

33. A process conforming to claim 3 and in which the bisque is subjected during the period of maximum temperature to contact with the gases of combustion from the source of heat.

34. A process conforming to claim 4 and in which the bisque is subjected during the period of maximum temperature to contact with the gases of combustion from the source of heat.

35. A process conforming to claim 5 and in which the bisque is subjected during the period of maximum temperature to contact with the gases of combustion from the source of heat.

36. A process conforming to claim 6 and in which the bisque is subjected during the period of maximum temperature to contact with the gases of combustion from the source of heat.

37. A process conforming to claim 7 and in which the bisque is subjected during the period of maximum temperature to contact with the gases of combustion from the source of heat.

38. A process conforming to claim 8 and in which the bisque is subjected during the period of maximum temperature to contact with the gases of combustion from the source of heat.

39. A process conforming to claim 9 and in which the bisque is subjected during the zone of maximum temperature to contact with the gases of combustion from the source of heat.

40. A process conforming to claim 10 and in which the bisque is subjected during the period of maximum temperature to contact with the gases of combustion from the source of heat.

41. A process conforming to claim 1 and in which the bisque after firing is caused to absorb an organic compound.

42. A process conforming to claim 2 and in which the bisque after firing is caused to absorb an organic compound.

43. A process conforming to claim 3 and in which the bisque after firing is caused to absorb an organic compound.

44. A process conforming to claim 4 and in which the bisque after firing is caused to absorb an organic compound.

45. A process conforming to claim 5 and in which the bisque after firing is caused to absorb an organic compound.

46. A process conforming to claim 6 and in which the bisque after firing is caused to absorb an organic compound.

47. A process conforming to claim 7 and in which the bisque after firing is caused to absorb an organic compound.

48. A process conforming to claim 8 and in which the bisque after firing is caused to absorb an organic compound.

49. A process conforming to claim 9 and in which the bisque after firing is caused to absorb an organic compound.

50. A process conforming to claim 10 and in which the bisque after firing is caused to absorb an organic compound.

51. The process of producing a ceramic body which comprises the operation of forming the bisque of a mixture containing a large proportion of talc and a relatively small proportion of clay.

52. The process of producing a ceramic body which comprises the operation of forming the bisque of a mixture containing a large proportion of unfused magnesia, a relatively small proportion of alumina and a still smaller proportion of calcium.

53. The process of producing a ceramic body which comprises the operation of forming the bisque of a mixture containing a large proportion of talc, a relatively small proportion of clay and a still smaller proportion of calcium.

54. The process of producing a ceramic body which comprises the operation of forming the bisque of a mixture containing over fifteen per cent of unfused magnesia and a smaller proportion of calcium.

55. The process of forming a ceramic body which comprises the operation of forming the bisque of a mixture containing over fifty per cent of talc and a relatively small proportion of calcium.

56. A ceramic body containing unfused magnesia, alumina and silica, the proportion of magnesia being in excess of the proportion of alumina.

57. A ceramic body comprising a body of bisque, a glaze thereon and a layer of material impervious to water within the bisque.

58. A ceramic body comprising a body of bisque, glaze covering part of the surface of said bisque, a layer of material impervious to water within said bisque adjacent to and extending throughout the area of said glaze.

59. A ceramic body comprising a body of bisque, glaze covering part of the surface of said bisque, the part of said bisque adjacent said glaze being impregnated with a material impervious to water, the surface of said bisque opposite said glaze being free of said material.

60. A tile comprising a body of bisque and a glaze on one side thereof, the part of said bisque adjacent said glaze being impregnated with a material impervious to water and the surface of said bisque opposite said glaze being free of said material.

61. A tile comprising a body of bisque and a glaze on one side thereof, the part of said bisque adjacent said glaze being impregnated with paraffin and the surface of said bisque opposite said glaze being free of paraffin.

62. The process of forming a ceramic body of a predetermined degree of hardness and strength which consists in subjecting the bisque mixture to greater pressure than necessary to produce the predetermined hardness and strength when the bisque is fired to a relatively high temperature and firing the bisque to a heat below said relatively high temperature but sufficiently high to produce the predetermined hardness and strength.

63. The process of producing a ceramic body which comprises the operation of forming the bisque of a mixture containing large proportions of silica and magnesia but with the silica in excess of the magnesia, a relatively small proportion of alumina and a still smaller proportion of calcium.

64. The process of producing a ceramic body which comprises the operation of forming the bisque of a mixture containing over fifteen per cent of magnesia, silica in excess of fifteen per cent and calcium in an amount less than fifteen per cent.

65. A ceramic body containing magnesia, alumina and silica, the proportion of magnesia being in excess of the alumina and the proportion of silica being in excess of the magnesia.

In testimony whereof, we have subscribed our names.

THEODORE C. PROUTY.
WILLIS O. PROUTY.